(12) United States Patent
Kari et al.

(10) Patent No.: US 6,779,091 B2
(45) Date of Patent: Aug. 17, 2004

(54) CONTACTLESS INTEGRATED CIRCUIT COMPRISING A WIRED LOGIC ANTICOLLISION CIRCUIT

(75) Inventors: Ahmed Kari, Aix En Provence (FR); Christophe Moreaux, Eguilles (FR)

(73) Assignee: STMicroelectronics SA, Montrouge (FR)

( * ) Notice: Subject to any disclaimer, the term of this patent is extended or adjusted under 35 U.S.C. 154(b) by 273 days.

(21) Appl. No.: 10/115,869

(22) Filed: Apr. 3, 2002

(65) Prior Publication Data

US 2002/0180487 A1 Dec. 5, 2002

(30) Foreign Application Priority Data

Apr. 4, 2001 (FR) .............................................. 01 04562

(51) Int. Cl.[7] .............................................. G06F 12/00
(52) U.S. Cl. ........................ 711/154; 342/51; 235/380
(58) Field of Search ............................... 235/380, 382, 235/492; 342/42, 44, 51; 370/205, 213; 365/183, 189, 189.12, 221, 230; 711/101–105, 109, 154, 164

(56) References Cited

U.S. PATENT DOCUMENTS

| | | | | |
|---|---|---|---|---|
| 3,900,848 A | * | 8/1975 | Mears | 342/95 |
| 4,758,836 A | * | 7/1988 | Scuilli | 340/870.31 |
| 5,297,268 A | * | 3/1994 | Lee et al. | 711/164 |
| 5,525,994 A | * | 6/1996 | Hurta et al. | 342/51 |
| 6,045,043 A | * | 4/2000 | Bashan et al. | 235/441 |

FOREIGN PATENT DOCUMENTS

| | | | |
|---|---|---|---|
| EP | 0495708 | 7/1992 | G08G/10/17 |
| EP | 0696011 | 2/1996 | G06K/7/08 |
| EP | 0702323 | 3/1996 | G06K/17/00 |
| EP | 0935222 | 8/1999 | G07C/9/00 |
| FR | 2736449 | 1/1997 | G06F/13/376 |
| FR | 2772164 | 6/1999 | G07C/9/00 |
| FR | 2780231 | 12/1999 | H04Q/7/20 |

* cited by examiner

Primary Examiner—Nasser Moazzami
Assistant Examiner—Hashem Farrokh
(74) Attorney, Agent, or Firm—Lisa K. Jorgenson; Allen, Dyer, Doppelt, Milbrath & Gilchrist, P.A.

(57) ABSTRACT

An integrated circuit having an identification code of M bits includes a communication interface circuit for receiving a selective identification request and a selection code, and a processing circuit connected thereto. The processing circuit includes a logic comparator having a first input for receiving the selection code and a second input for receiving the identification code, and an output for delivering an equal signal if the selection and identification codes are equal. A shift register has an output coupled to the first input of the logic comparator. A serial memory stores the identification code, and has a serial output coupled to the second input of the logic comparator and to a serial input of the shift register. A controller is connected to the shift register and to the serial memory for loading the selection code into the shift register, and for applying M shift pulses to the shift register and M read pulses to the serial memory. An inhibiting circuit inhibits the logic comparator when N shift and read pulses have been applied to the shift register and to the serial memory.

34 Claims, 6 Drawing Sheets

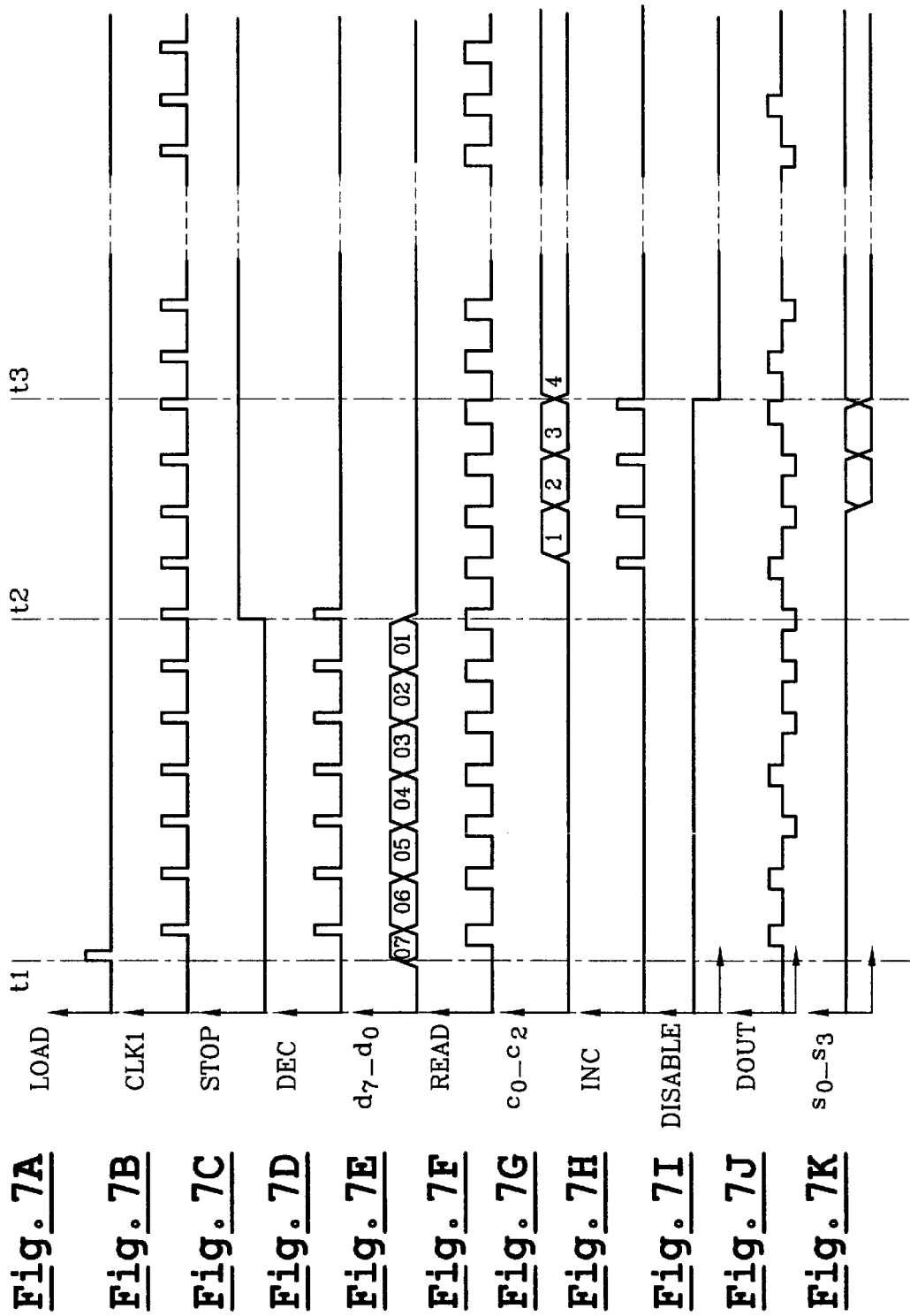

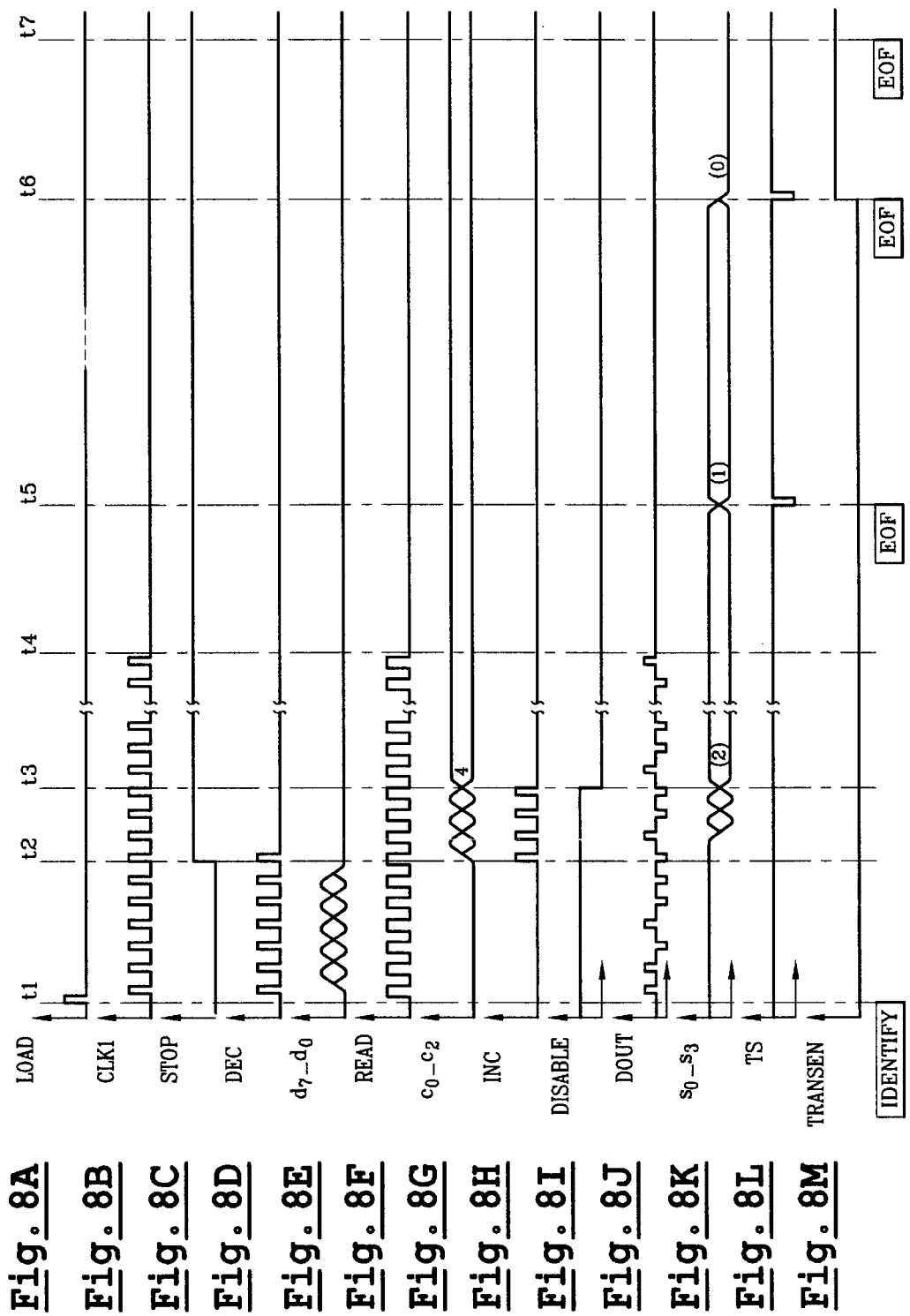

CONTACTLESS INTEGRATED CIRCUIT COMPRISING A WIRED LOGIC ANTICOLLISION CIRCUIT

FIELD OF THE INVENTION

The present invention relates to integrated circuits, and in particular, to contactless integrated circuits with a communication interface operating with electromagnetic induction and inductive coupling.

The present invention more particularly relates to the implementation of a wired logic function in an integrated circuit, allowing the processing of a selective identification request accompanied with a selection code.

BACKGROUND OF THE INVENTION

FIG. 1 schematically shows a situation in which a selective identification request can be used. A data emitting-receiving station ST provided with an antenna coil and operating with inductive coupling emits a magnetic field FLD. A plurality of contactless integrated circuits $CIC_1$, $CIC_2$, ... $CIC_n$ (or transponders), also provided with antenna coils, are located in the emitting perimeter of the station, i.e., the interrogation field, for communicating with the station.

Each integrated circuit is identifiable by an identification code $ID_1$, $ID_2$, ... $ID_n$ stored in an internal memory. Although not shown, each integrated circuit is arranged on a portable support to form a contactless operating device like a contactless chip card, an electronic tag, etc.

When the station ST wants to communicate with one of the integrated circuits, or inventory the integrated circuits present in the interrogation field, the station sends a selective identification request accompanied with a selection code. Each integrated circuit compares its ID code with the selection code, and sends back to the station an identification message comprising the ID code if the result of the comparison is positive.

The selection code sent by the station is generally of a smaller length than the ID code. Furthermore, the selective identification request may be accompanied with a parameter indicating the number N of bits to be compared between the two codes. The integrated circuits having an ID code identical to the selection code generally respond on a response scale comprising several response positions to avoid collisions between responses. These response positions may be random or depend on internal data of the integrated circuits.

By way of example, FIG. 2A shows the conventional format of a selective identification request as provided by the standard ISO/IEC/FCD 15693-3, called INVENTORY command, for allowing a data emitting-receiving station to inventory the contactless circuits present in its interrogation field. The INVENTORY command comprises a start of frame field SOF, a request flags field RF with a length of 8 bits, a command field CMD with a length of 8 bits (containing the INVENTORY command code), a mask length field ML with a length of 8 bits, a mask value field MV having a length from 0 to 8 bytes, a CRC code and a end of frame field EOF.

The term mask designates the selection code. Each integrated circuit compares its identification code ID to the mask MV supplied by the station. The number N of bits to be compared between the ID code and the mask MV is specified by field ML. Thus, as illustrated in FIG. 2B, an integrated circuit having an ID code of M bits, receiving a selective identification request comprising a field ML equal to N, only compares N bits of the ID code with N bits of the mask MV.

FIG. 2C shows the format of the response which is sent back by an integrated circuit having an ID code comprising N bits similar to mask MV. This response simply comprises the identification number ID of the integrated circuit preceded with the field SOF, and followed with a CRC code and with the end of frame field EOF.

To better understand the present discussion, FIG. 2D shows the response scale relating to an INVENTORY command. This response scale comprises various response positions $TS_0$, $TS_1$, ... $TS_n$, (Time Slots) on which the integrated circuits can position themselves. These response positions TS are controlled by the station and are determined by the sending of end of frame messages EOF, to which is added a response time t1.

The integrated circuits choose their response positions according to a number P, which is defined herein by the 4 bits of the ID code, which follow the N bits to be compared with the mask MV (16 possible response positions). A station can also force all the integrated circuits to respond on the first response position TS0 by setting to 1 the bit 5 of field RF.

The processing of a selective identification request in a microprocessor integrated circuit presents generally no difficulty, and is performed by a program providing the comparison of the codes and the sending of the ID code if the result of the comparison is positive. The processing of a selective identification request in a wired logic integrated circuit is more delicate, and requires a relatively complex circuit occupying a non-negligible silicon surface area.

SUMMARY OF THE INVENTION

In view of the foregoing background, an object of the present invention is to provide a wired logic circuit with a relatively straightforward structure that is also compact for processing a selective identification request.

Another object of the present invention is to provide a wired logic circuit of the above mentioned type which is compatible with storage of the identification code of an integrated circuit in a serial output memory.

A serial output memory presents the advantage of having a relatively straightforward and low cost structure, since only one sense amplifier is required. Such a memory has a read time (bit after bit) which is rather long compared to the time given to respond to an identification request. If referred to the above cited standard, the minimal time t1 between the reception of the INVENTORY command and the first response position $TS_0$ is on the order of 320 microseconds (FIG. 2D)

It is thus necessary to provide a first buffer register for storing mask MV, and a second buffer register for storing the identification code ID. The second buffer register allows the ID code to be rapidly emitted after its comparison with the selection code, and without the need of reading the serial memory a second time.

However, two buffer registers of several bytes each occupy a non-negligible place and do not fulfill the simplicity requirements of a wired logic circuit. Thus, still another object of the present invention is to provide a wired logic circuit capable of processing a selective identification request with a minimum number of buffer registers.

These and other objects, advantages and features according to the present invention are achieved by providing a method of processing, in an integrated circuit to which is allocated an identification code and a selective identification request accompanied with a selection code. The method comprises the steps of providing a shift register, a serial memory and a logic comparator, and storing the identification code of the integrated circuit in the serial memory, and loading the received selection code into the shift register.

The method further comprises coupling a serial output of the shift register to a first input of a logic comparator, and coupling a serial output of the memory to a second input of the comparator and to a serial input of the shift register. M shift pulses are applied to the shift register and M read pulses are applied to the memory. The comparator is inhibited when N shift and read pulses have been applied to the register and the memory. The method further includes delivering data present in the shift register to a communication interface of the integrated circuit, at a predetermined time, if the comparator delivers an equal signal.

The method may comprise a step of down-counting the number N using a first down-counter in which the number N is loaded, and a step of delivering an inhibit signal of the comparator when zero is reached. The comparator may be inhibited when the comparator delivers an inequality signal.

The step of delivering data present in the shift register to the communication interface preferably comprises the connection of an output of the shift register to the communication interface of the integrated circuit when an authorization signal is delivered. The authorization signal is delivered at the latest when the predetermined time is reached, except if the comparator delivers an inequality signal.

The authorization signal may be delivered by a second down-counter provided for counting a number P. The authorization signal is delivered when the down-counter reaches zero. A down-counting signal by one unit is applied to the second down-counter at each reception, by the integrated circuit, of a response request to the selective identification request.

The method preferably comprises a step of loading the number P into the second down-counter after the application of N shift pulses to the shift register and N read pulses to the memory, if the comparator does not deliver an inequality signal. The loading of the number P into the second down-counter comprises a bit by bit loading, into the second down-counter, of L bits of the identification code, delivered by the memory after the application of N read pulses.

The shift register may be designed with at least two shift registers arranged in parallel, and having serial inputs coupled to a demultiplexer and serial outputs coupled to a multiplexer. The method may be implemented for processing an INVENTORY command provided by the ISO/IEC/FCD 15693-3 standard.

The present invention also relates to an integrated circuit comprising an identification code of M bits and means for processing a selective identification request accompanied with a selection code. The processing means comprise a shift register comprising a serial output coupled to a first input of a logic comparator, a serial memory containing the identification code and comprising a serial output coupled to a second input of the comparator and to a serial input of the shift register.

The processing means further includes means for loading into the shift register a received selection code, means for applying M shift pulses to the shift register and M read pulses to the memory, means for inhibiting the comparator when N shift and read pulses have been applied to the register and the memory. There is also means for delivering to a communication interface of the integrated circuit, at a predetermined time, data present in the shift register, if the comparator delivers an equal signal.

The means for inhibiting the comparator may comprise a first counting circuit arranged to count the number N in synchronization with the shift and read pulses, and to deliver an inhibition signal of the comparator when the number N is counted. The first counting circuit may comprise a down-counter, means for loading the number N into the down-counter, and a logic circuit for delivering the inhibition signal when the down-counter reaches the value zero.

The means for inhibiting the comparator are arranged to inhibit the comparator when the comparator delivers an inequality signal. The means for inhibiting the comparator are also arranged to inhibit the first counting circuit when the comparator delivers an inequality signal. The comparator may comprise synchronous latches driven by a signal synchronized with the shift and read pulses. The means for inhibiting the comparator comprise a logic gate for blocking the synchronization signal of the comparator's latches.

The means for delivering data present in the shift register to the communication interface of the integrated circuit comprise means for coupling a serial output of the shift register to the communication interface of the integrated circuit when an authorization signal is delivered, means for delivering the authorization signal at the latest when the predetermined time is reached, and means for preventing the delivery of the authorization signal when the output of the comparator presents an inequality value.

The means for delivering the authorization signal comprise a second counting circuit arranged to count a number P and to deliver the authorization signal when the number P is counted, and a controller for applying, to the counting circuit, a counting signal by one unit at each reception, by the integrated circuit, of a response request to the selective identification request. The second counting circuit may comprise a down-counter, means for loading the number P into the down-counter, and means for delivering the authorization signal when the down-counter reaches the value zero.

The means for loading the number P into the down-counter are arranged to start the loading of the number P after the application of N shift pulses to the shift register and N read pulses to the memory, if the comparator does not deliver an inequality signal. The means for loading the number P into the down-counter may comprise means for a bit by bit loading of L bits of the identification code delivered by the memory after N read pulses. The means for loading the L bits of the identification code into the down-counter may comprise a counter arranged to count L one bit loading cycles and means for inhibiting the loading of the down-counter when the number L is reached.

The shift register also comprises a parallel input for receiving the selection code. The shift register may comprise at least two shift registers arranged in parallel, having serial inputs coupled to a demultiplexer and serial outputs coupled to a multiplexer.

The integrated circuit preferably comprises a contactless communication interface operating with inductive coupling. The integrated circuit is arranged to process a selective identification request INVENTORY provided by the ISO/IEC/FCD 15693-3 standard. The present invention also relates to a portable electronic device of the chip card type, electronic label type or analog type, with each comprising an integrated circuit according to the invention.

BRIEF DESCRIPTION OF THE DRAWINGS

These objects, characteristics and advantages, as well as others of the present invention, will be described with more details in the following description of an integrated circuit according to the invention, given in a non-limiting way in relation with the standard ISO/IEC/FCD 15693-3 and with the accompanying drawings, in which:

FIGS. 7A to 7K show various electrical signals which appear in the integrated circuit of FIG. 3 at the time of processing a selective identification request according to the present invention; and FIGS. 8A to 8M show various electrical signals which appear in the integrated circuit of FIG. 3 at the time of processing a selective identification request, and FIGS. 8A to 8K are identical to FIGS. 7A to 7K but are represented with a compressed time scale.

DETAILED DESCRIPTION OF THE PREFERRED EMBODIMENTS

Figure 3:
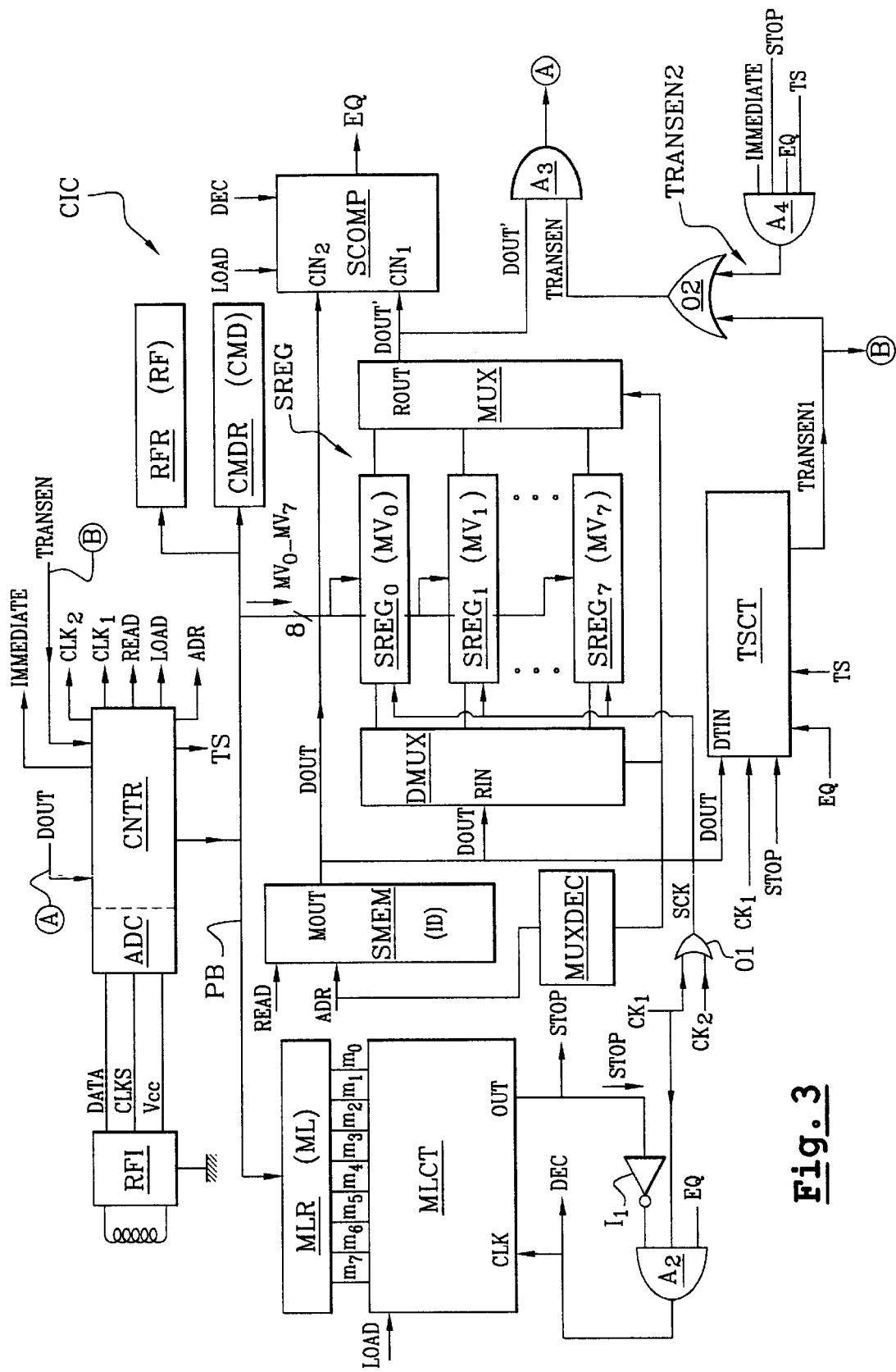
FIG. 3 is a block diagram of an integrated circuit comprising a wired logic function according to the present invention for processing a selective identification request.

FIG. 3 is a diagram of a contactless integrated circuit CIC according to the invention. The contactless integrated circuit CIC comprises a wired logic circuit provided for processing a selective identification request accompanied with a selection code, or mask MV. The illustrated integrated circuit is specifically designed for processing a selective identification request according to the standard ISO/IEC/FCD 15693-3, or INVENTORY command, as described above. Some specific features provided in relation with this standard will be described in a non-limiting way only as an example of implementing the invention.

The integrated circuit CIC conventionally comprises a contactless communication interface RFI and a controller CNTR. The controller is a wired logic sequential circuit or state machine, which delivers control signals to the various elements of the integrated circuit. Interface RFI is provided with an antenna coil for exchanging data DATA, using inductive coupling, with a data emitting-receiving station.

The exchanged data DATA are PPM coded (Pulse Position Modulation). They are transformed into bytes by a decoder/coder ADC. Interface RFI also delivers a supply voltage Vcc to the integrated circuit, which is obtained by rectifying a voltage induced in its coil, and delivers to the controller CNTR a clock signal CLKS extracted from the oscillation frequency of the ambient magnetic field emitted by the data emitting-receiving station.

The integrated circuit CIC conventionally comprises various registers for storing the fields of an INVENTORY command, in particular, a register RFR for storing the Request Flags field RF (8 bits), a register CMDR for storing the Command field CMD (8 bits), a register MLR for storing the Mask Length field ML (8 bits) and a register SREG for storing the mask MV (0 to 8 bytes). These registers are of the parallel loading type, with the data being received by groups of 8 bits because of the PPM coding.

The loading of the registers is performed by the controller CNTR over a parallel data bus PB. The various selection and loading signals of the registers are not shown for simplicity. Still conventionally, these registers have outputs (not shown) directly applied to the controller CNTR so that the latter performs, as a state machine, predefined actions which depend on the values of the fields stored in the registers.

The integrated circuit CIC also comprises a memory SMEM with a serial output MOUT, for example an EEPROM memory, in which the identification code ID of the integrated circuit is permanently stored, with a length of M bits. If the ID code has 8 bytes, M is thus equal to 64. The memory SMEM receives address signals ADR sent by the controller CNTR and read signals READ. The address signals ADR conventionally comprise a word line selection signal and a column selection signal, which are not shown but are well known by those skilled in the art, for allowing the bit by bit reading of the memory on output MOUT.

According to the invention, the register SREG is a shift register comprising a serial input RIN connected to the serial output MOUT of the memory, and a serial output ROUT is connected to an input CIN1 of a comparator SCOMP. The comparator SCOMP comprises a second input CIN2 connected to the output MOUT of the memory. The register SREG is formed by eight sub-shift registers of 8 bits each, respectively $SREG_0$, $SREG_1$, ... $SREG_7$.

The sub-registers are arranged in parallel. They have their serial inputs connected to the outputs of a demultiplexer DMUX, and their serial outputs connected to the inputs of a multiplexer MUX. The input of the demultiplexer DMUX forms the input RIN of the register SREG, and the output of the multiplexer MUX forms the output ROUT of the register SREG.

The elements MUX and DMUX are driven by a decoder MUXDEC receiving as an input the address signals ADR applied to the memory SMEM, and the sub-registers are driven by a shift signal SCK delivered by the output of an OR-gate referenced O1. Gate O1 receives as an input a shift signal $CK_1$ during phase comparisons and loading of the register SREG, and a shift signal $CK_2$ during phase responses to an INVENTORY command, as this will be seen below. Signal SCK is thus equal to signal $CK_1$ or to signal $CK_2$ according to the running operating phase.

The set formed by the sub-registers, the multiplexer and the demultiplexer thus forms the equivalent of a monolithic shift register of 64 bits. This structure of a shift register is described by way of a non-limiting example, and has been chosen here to make easier the byte by byte loading of mask MV (Mask Value). Each sub-register $SREG_0$ to $SREG_7$ has a parallel input connected to the data bus PB, and receives one byte of the mask MV, respectively bytes $MV_0$ to $MV_7$.

The comparator SCOMP is a synchronous comparator driven by a synchronization signal DEC. It delivers a signal EQ (EQUAL) which is equal to 1 after the application of two identical bit chains to the inputs CIN1 and CIN2, or equal to 0 if at least two bits of the bit chains are different. A signal LOAD delivered by the controller ensures the setting to 1 of the signal EQ before the start of a comparison cycle.

Figure 4:
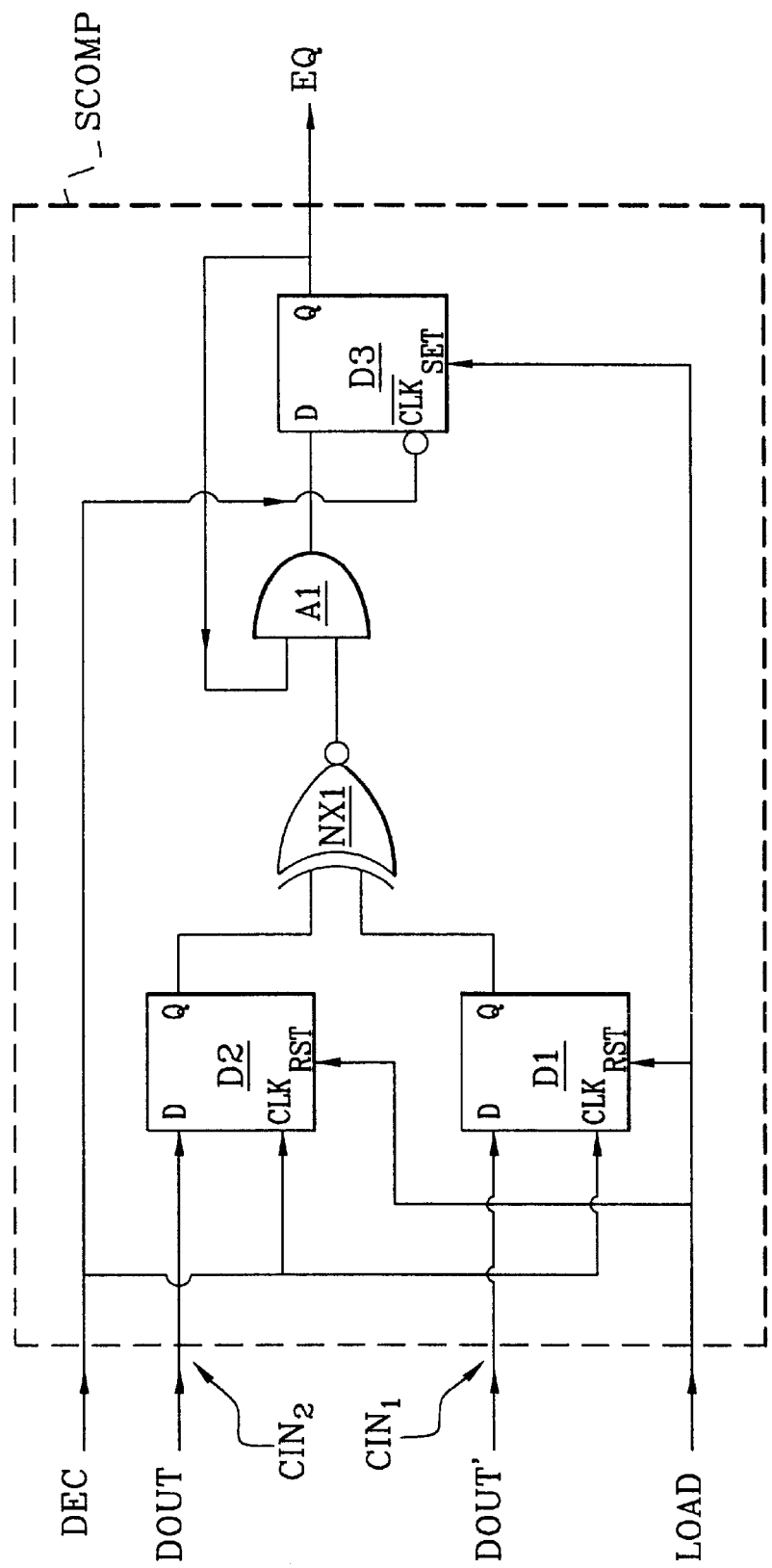
FIG. 4 is a detailed diagram of the comparator illustrated in FIG. 3.

An example embodiment of the comparator is represented in FIG. 4. The comparator comprises three latches D1, D2 and D3. The D inputs of latches D1 and D2 form respectively the inputs CIN1 and CIN2 of the comparator. The Q outputs of latches D1 and D2 are connected to the inputs of an inverting XOR gate NX1, the output of which is sent to an input of an AND-gate A1.

The output of gate A1 is connected to the D input of latch D3. The Q output of latch D3 forms the output of the comparator and delivers the signal EQ. Signal EQ is brought back on a second input of gate Al to block the comparator when signal EQ passes to 0. Latches D1 and D2 receive the synchronization signal DEC on their clock inputs CLK, when latch D3 receives the signal DEC on an inverted clock input. The signal LOAD is applied to reset the inputs RST of latches D1, D2 and to set to 1 the input SET of latch D3.

Thus, the comparator loads two bits received by the inputs CIN1, CIN2 at the rising edge of the signal DEC and delivers the result of the comparison at the falling edge of the signal DEC. The comparison is performed by gate NX1. The application of the signal EQ to the comparator sets to 1 the Q output of latch D3 (signal EQ) and resets to 0 the Q outputs of latches D1 and D2.

Referring again to FIG. 3, the signal DEC is delivered by the output of a gate A2 of the AND-type which receives, as inputs, the signal EQ, the above mentioned signal $CK_1$ and a signal NSTOP delivered by an inverting gate I1 receiving a signal STOP as an input. The signal STOP is delivered by a counting circuit MLCT having eight inputs $m_0-m_7$ coupled to corresponding outputs of the register MLR.

Figures 5, 6:
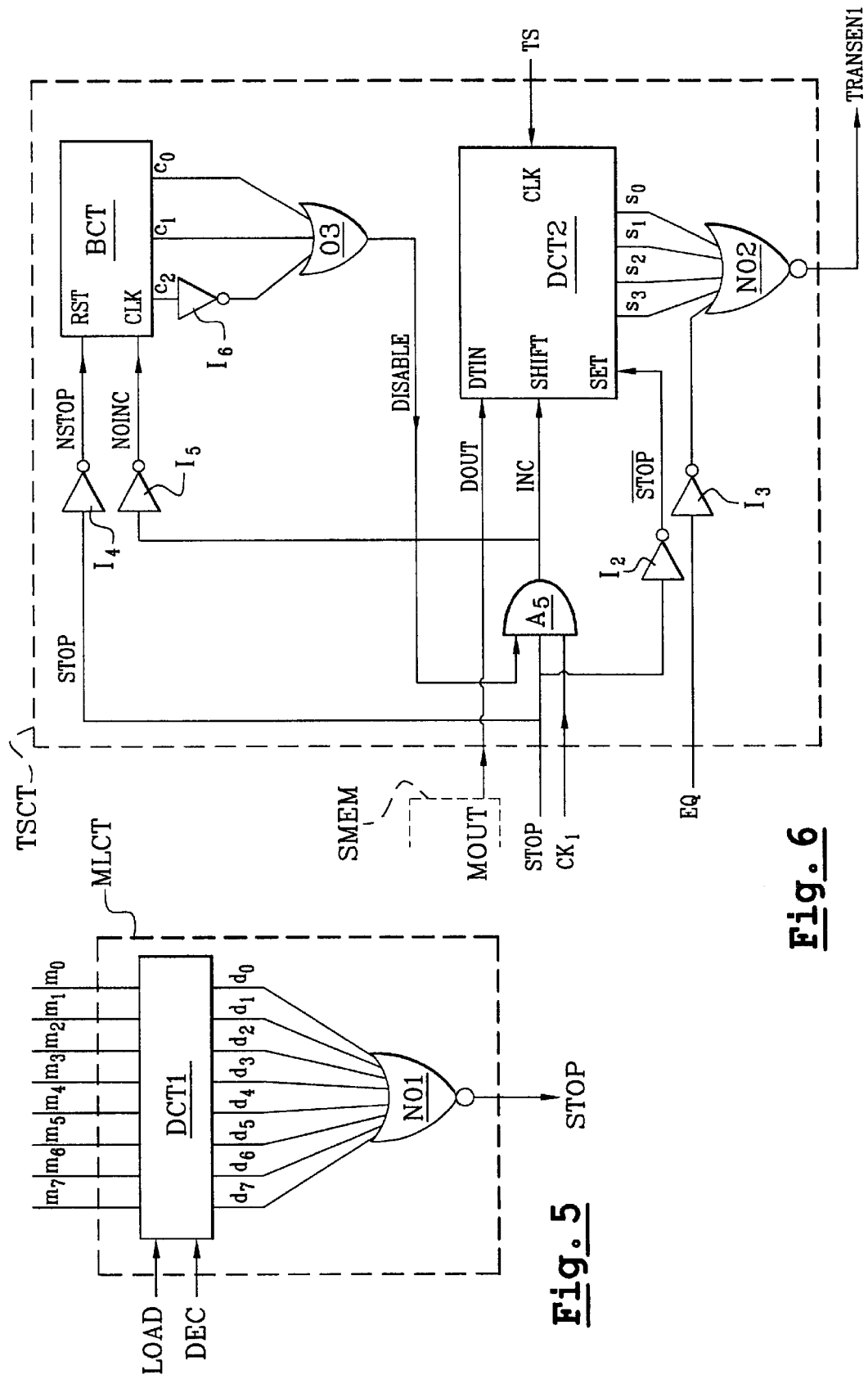
FIG. 5 is a detailed diagram of the first counting circuit illustrated in FIG. 3.
FIG. 6 is a detailed diagram of the circuit delivering the authorization signal in FIG. 3.

The counting circuit MLCT, represented with more details in FIG. 5, comprises a down-counter DCT1 with parallel loading, the inputs of which form the inputs $m_0-m_7$ of circuit MLCT. Eight outputs $d_0-d_7$ are connected to the inputs of a NOR-gate NO1. The output of the gate NO1 delivers the signal STOP. The loading, into the down-counter DCT1, of a mask length field ML present in the register MLR is ensured by the signal LOAD, and the signal DEC is applied to the clock input CLK of the down-counter DCT1 as a down-counting signal.

The wired logic circuit according to the invention operates as follows. After reception of an INVENTORY command, the fields of the command are loaded into their respective registers by the controller. The mask MV is loaded into the register SREG, the command field CMD is loaded into register CMDR, field RF is loaded into the register RFR and field ML is loaded into the register MLR. After having decoded the command field CMD, the controller starts a comparison sequence of N bits of the mask MV with N bits of the ID code present in the memory SMEM. The number N to be compared is defined by the mask length field ML.

This comparison sequence is illustrated in FIGS. 7A to 7F, which respectively shows the signal LOAD, the signal $CK_1$, the signal STOP, the signal DEC, the signals $d_0-d_7$ at the output of down-counter DCT1 (counting circuit MLCT), and the signal READ. The data DOUT delivered by the memory SMEM (bits of the ID code) are represented in FIG. 7J. In this example N=7, that is, a field ML equal to 00000111 in register MLR.

For starting the comparison sequence, the controller sets the first signal LOAD to 1 (FIG. 7A) at a time t1. Thus, the comparator SCOMP is reset and the field ML is loaded into the counting circuit MLCT. The controller then emits a series of read pulses READ and shift pulses $CK_1$, which are synchronous (FIGS. 7B and 7F). Each pulse READ appears substantially before each pulse $CK_1$ in order to take into account the reading time of a bit in the memory SMEM. At each new pulse READ, the controller increments by one unit the address ADR applied to the memory SMEM. The first applied address is the address of the less significant bit of the ID code. The address ADR determines also the sub-register which is selected in the register SREG by the decoder MUXDEC.

As long as the signal STOP is at 0, gate A2 is conductive and the signal DEC copies signal $CK_1$ (FIG. 7D), activating the comparator SCOMP and the counting circuit MLCT. Thus, the bits of the mask MV are received one after the other by the input CIN1 of the comparator when the bits of the ID code are received by input CIN2. During this comparison step, the bits of the ID code are also present on the input RIN of the register SREG and enter the register, progressively replacing the bits of the mask MV, which are delivered by the output ROUT, and are thus cleared from the register SREG.

If at a certain time two bits of the ID and MV codes are different, signal EQ passes to 0 and blocks gate A2, so that signal DEC is no longer applied to the counting circuit MLCT and to the comparator SCOMP. The wired logic circuit remains blocked until reception of a new signal LOAD equal to 1, which will be emitted only after reception, if the case arises, of a new INVENTORY command.

If the N bits of the ID code are identical to the N bits of the mask MV, the comparison cycle ends at a time t2 when the down-counter DCT1 reaches the value 0 (FIG. 7E), and the signal STOP passes to 1 (FIG. 7C). Gate A2 becomes non-conductive and signal DEC (FIG. 7D) is neither applied to the counting circuit MLCT nor to the comparator SCOMP any more. Signal EQ is maintained at 1 by the latch D3 of the comparator.

After time t2, the controller continues to apply read pulses READ to the memory (FIG. 7F) and shift pulses $CK_1$ (FIG. 7F) to the register SREG, so that the M–N remaining bits of the ID code are loaded into the register SREG. The number M–N of the pulses to be applied is known by the controller as the length M of the ID code and is predefined in the integrated circuit.

Thus, according to the invention, two operations are performed at the same time: the bit by bit comparison of mask MV with the ID code, and the loading of the N first bits of the ID code into the register SREG. Besides a non-negligible saving of time in the loading of the ID code into register SREG, the advantage of this element's arrangement is that the register SREG is used both as a receiving buffer of the mask MV for its comparison with the ID code, and as a storage buffer of the ID code for the emission of a response to an identification request.

For the emission of the ID code from the register SREG, the output ROUT of the register is connected to the decoder/coder ADC of the controller CNTR by an AND-gate A3 receiving on another input a transmission authorization signal TRANSEN (Transmit Enable) which passes to 1 at the latest when the response position to the INVENTORY command is reached.

According to another aspect of the invention appearing in FIG. 3, the response position is determined by a counting circuit TSCT delivering a signal TRANSEN1 applied to an OR-gate O2, the output of which delivers the signal TRANSEN. This counting circuit preferably operates as a down-counter and performs a down-counting from a number P which is supplied to it. It receives a signal STOP as an input and remains blocked as long as the signal STOP is not at 1. It also receives a signal EQ as an input and remains blocked when the signal EQ is at 0, because no response must be sent if the result of the comparison between the N bits of the ID code and the N bits of mask MV is not positive.

Figure 1:
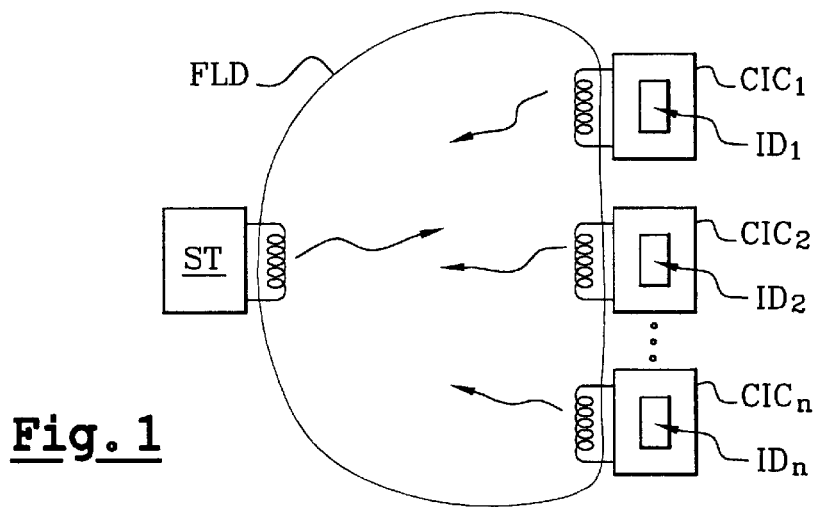
FIG. 1 shows a data emitting-receiving station and several contactless integrated circuits according to the prior art.
Figure 2D:
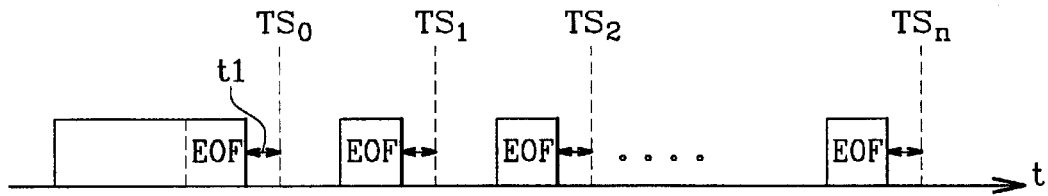
FIGS. 2A to 2D illustrate implementation of a selective identification request based upon the standard ISO/IEC/FCD 15693-3 according to the prior art.
Figure 2A:
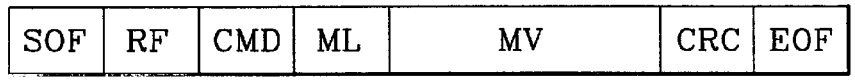
Figure 2C:
Figure 2B:
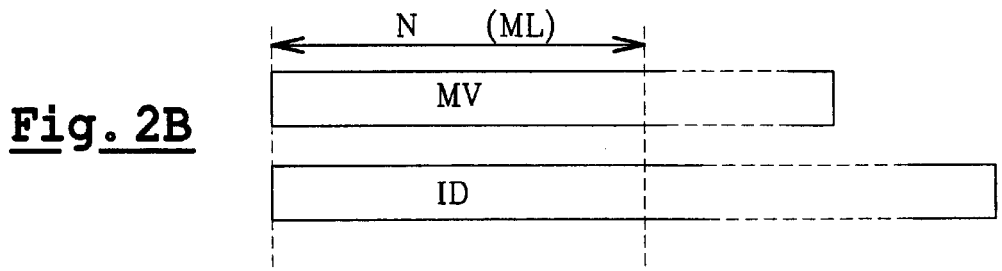

The down-counting performed by the circuit TSCT is clocked by pulses NTS (Next Time Slot) delivered by the controller at each time it receives a response request to the INVENTORY command (end of frame field EOF, FIG. 2D) and the signal TRANSEN1 passes to 1 when the P pulses NTS have been applied to the circuit TSCT.

As recalled above, the request flag field RF of the INVENTORY command may specify (when bit 5 is at 1) that the identification response must, if the case arises, be emitted on the first response position. This possibility is dealt with by providing an AND-gate A4 which receives as inputs the signals STOP and EQ as well as a signal IMMEDIATE. Gate A4 delivers a signal TRANSEN2 applied to a second input of gate O2. Signal IMMEDIATE is delivered by the controller and is automatically set to 1 if bit 5 of the field RF is equal to 1 in the register RFR.

Thus, three cases may occur when the controller receives the first response request (EOF). If bit 5 of the field RF is equal to 1, the controller sets to 1 the signal IMMEDIATE and sends a response containing the ID code present in the register SREG. If bit 5 is equal to 0 and the signal TRANSEN1 is equal to 1 (P=0), the controller also provides for the sending of a response containing the ID code. If bit 5 and signal TRANSEN1 are both equal to 0, the controller applies a down-counting pulse NTS to the circuit TSCT.

When a new response request is received, the controller sends a response containing the ID code if the signal TRANSEN1 is at 1, and if not, it applies a pulse NTS to circuit TSCT. To send a response containing the ID code, the controller scans in M cycles the addresses ADR of the bits of the ID code, applying shift signals $CK_2$ to register SREG without applying the signals READ to the memory SMEM, which thus remains inactive. Consequently, the bits of the ID code are read in the register SREG at the rate of the signal $CK_2$ and are applied via gate A3 to the decoder/coder ADC, before being sent to the interface RFI. In an alternative embodiment, a parallel reading of the ID code by the controller, performed byte by byte by the bus PB, may be provided.

A specific embodiment of the counting circuit TSCT will now be described provided in relation to the standard ISO/IEC/FCD 15693-3. The number P supplied to the counting circuit TSCT may be determined in various ways and may be, for example, a random or a pseudo-random number dependent on data present in the integrated circuit. However, based upon the cited standard, the number P is defined by the four bits of the ID code which immediately follow the N bits compared with the bits of the mask MV. The embodiment of the circuit TSCT represented in FIG. 6 is provided in relation with this feature.

The circuit TSCT comprises a down-counter DCT2 and a counter BCT. Down-counter DCT2 is a down-counter by 16 with a serial loading, comprising a data input DTIN and an input SHIFT for clocking a bit by bit loading. It also comprises an input SET for setting to 1 its content (number P), a clock input CLK for down-counting and four outputs $s_0$–$s_3$. Clock input CLK receives signal NTS and input DTIN is connected to the output MOUT of the memory.

The input SHIFT is driven by a signal INC delivered by an AND-gate A5, receiving as inputs the signals STOP and $CK_1$ as well as a signal DISABLE. Input SET receives the complement of signal STOP by an inverting gate I2. The outputs $s_0$–$s_3$ are sent to inputs of a NOR-gate NO2. Gate NO2 delivers the signal TRANSEN1 and receives on a fifth input the complement of the signal EQ by an inverting gate I3.

Counter BCT is a by 8 counter comprising a reset input RST, a clock input CLK and three outputs $c_0 c_2$. Input RST receives a signal NSTOP, complement of signal STOP, delivered by an inverting gate I4. The input CLK receives a signal NOINC, complement of signal INC, delivered by an inverting gate I5. The outputs $c_0$ and $c_1$ are applied to two inputs of an OR-gate O3, and the output $c_2$ is applied to a third input of gate O3 by an inverting gate I6. Gate O3 delivers the signal DISABLE.

The operation of the circuit TSCT is illustrated in FIGS. 7G, 7H, 7I and 7K, which respectively show the outputs $c_2$–$c_0$, signal INC, signal DISABLE and the outputs $s_3$–$s_0$. At the above mentioned time t2, the comparison phase is finished and signal STOP passes to 1 (FIG. 7C), resetting the counter BCT and setting to 1 the signal DISABLE, regardless of its previous value (1 in FIG. 7I). Gate AS becomes conductive and lets pass the pulses $CK_1$ delivered by the controller, which arrive to the input SHIFT of the down-counter DCT2. Thus, the bits delivered by the output MOUT of the memory are loaded into the down-counter DCT2 (input DTIN), parallel to their loading into the register SREG. Signal NOINC also copies the pulses $CK_1$, and the counter BCT is incremented by one unit after each loading of one bit into the down-counter DCT2 when the pulses $CK_1$ have a falling edge.

At a time t3, when four bits have been loaded into the down-counter DCT2, the output of the counter BCT becomes equal to 4 (100) and signal DISABLE passes to 0 (FIG. 7I). Signal DISABLE at 0 blocks the gate AS and prevents any other loading of bits into the down-counter DCT2, and any other incrementing of the counter BCT. The loading of the four bits of the ID code is then finished and the down-counter DCT2 is ready to receive, on its input CLK, down-counting pulses NTS sent by the controller on reception of response requests EOF.

FIGS. 8A to 8M illustrate the general operation of the wired logic circuit according to the invention. FIGS. 8A to 8K are identical to FIGS. 7A to 7K and show the same signals on a compressed time scale. FIG. 8L shows the signal NTS and FIG. 8M shows the signal TRANSEN1. In these figures, the N bits comparison phase which extends between times t1 and t2, the loading phase of four bits of the ID code into circuit TSCT which extends between times t2 and t3, and the loading phase into register SREG of the M–N remaining bits of the ID code, which extends between time t2 and a time t4, are all illustrated. After time t4, the circuit is at rest and the controller waits for the first response request EOF.

Here it is assumed that the number P represented by the four bits of the ID code loaded into circuit TSCT is equal to 2 and that field RF is not equal to zero. This means that the response will have to be sent, if the case arises, on a third response position TS2, after response positions TS0 and TS1.

At a time t5, the first response request is received (response position TSO) and the controller applies a pulse NTS to circuit TSCT (FIG. 8L) because the signal TRANSEN1 is not equal to 1. The output of the circuit TSCT passes from p=2 to p=1 (FIG. 8K) and the signal TRANSEN1 remains at 0. At a time t6, a second response request is received (response position TS1) and the controller applies a new pulse NTS to the circuit TSCT. The output of the down-counter passes from p=1 to p=0 and the signal TRANSEN1 passes to 1 (FIG. 8M). Gate A3 (FIG. 3) becomes conductive, freeing the data path between the output of the register SREG and the communication interface RFI. The response is sent at a time t7, on reception of a third response request.

It will be clearly apparent to those skilled in the art that the present invention is likely to have various alternative embodiments, in particular, regarding the structure and the arrangement of the various circuits which have been described, while remaining within the spirit and scope of the present invention. In a general way, the present invention can be applied to the processing of various types of selective identification requests responding to various other protocols than the one provided by the standard ISO/IEC/FCD 15693-3, with an adaptation, within the skills of those skilled in the art, of the above described circuit architecture. The present invention can also be applied to the processing of personalized selective identification requests provided in applications where there is no standard.

That which is claimed is:

1. An integrated circuit having an identification code of M bits, and comprising:
   a communication interface circuit for receiving a selective identification request and a selection code; and
   a processing circuit connected to said communication interface circuit for processing the selective identification request and the selection code, said processing circuit comprising:
      a logic comparator having a first input for receiving the selection code and a second input for receiving the identification code, and an output for delivering an equal signal if the selection and identification codes are equal,
      a shift register having a serial output coupled to the first input of said logic comparator for providing the selection code thereto,
      a serial memory for storing the identification code and having a serial output coupled to the second input of said logic comparator and to a serial input of said shift register,
      a controller connected to said shift register and to said serial memory for loading the selection code into said shift register, and for applying M shift pulses to said shift register and M read pulses to said serial memory,
      an inhibiting circuit connected to said shift register, to said controller and to said logic comparator for inhibiting said logic comparator when N shift and read pulses have been applied to said shift register and to said serial memory, and
      a data delivery circuit for delivering to said communication interface circuit data in said shift register when said logic comparator delivers the equal signal.

2. An integrated circuit according to claim 1, wherein said inhibiting circuit comprises a first counting circuit for counting the N shift and read pulses in synchronization with one another, and for delivering an inhibit signal to said logic comparator when the N shift and read pulses have been counted.

3. An integrated circuit according to claim 2, wherein said first counting circuit comprises:
   a down-counter for receiving a signal from said controller corresponding to the number N; and
   a logic circuit connected to said down-counter for delivering the inhibit signal when said down-counter reaches zero.

4. An integrated circuit according to claim 1, wherein said inhibiting circuit inhibits said logic comparator when said logic comparator delivers an unequal signal if the selection and identification codes are not equal.

5. An integrated circuit according to claim 2, wherein said inhibiting circuit inhibits said first counting circuit when said logic comparator delivers an unequal signal if the selection and identification codes are not equal.

6. An integrated circuit according to claim 1, wherein said logic comparator comprises a plurality of synchronous latches driven by a synchronization signal synchronized with the shift and read pulses.

7. An integrated circuit according to claim 6, wherein said inhibiting circuit comprises a logic gate for blocking the synchronization signal to said plurality of synchronous latches.

8. An integrated circuit according to claim 1, wherein said data delivery circuit delivers an authorization signal to said controller when said logic comparator delivers the equal signal, and comprises a logic circuit for preventing the delivery of the authorization signal when said logic comparator delivers an unequal signal if the selection and identification codes are not equal; and wherein said controller couples the serial output of said shift register to said communication interface circuit when the authorization signal is delivered.

9. An integrated circuit according to claim 8, wherein said data delivery circuit counts a number P and delivers the authorization signal when the number P is counted; and wherein said controller applies a counting signal to said data delivery circuit at each reception by said communication interface circuit of a response request to the selective identification request.

10. An integrated circuit according to claim 9, wherein said data delivery circuit comprises:
    a down-counter;
    a first logic circuit for loading the number P into said down-counter; and
    a second logic circuit for delivering the authorization signal when said down-counter reaches zero.

11. An integrated circuit according to claim 10, wherein said first logic circuit starts the loading of the number P after application of the N shift pulses to said shift register and the N read pulses to said serial memory if said logic comparator does not deliver the unequal signal.

12. An integrated circuit according to claim 11 wherein said first logic circuit starts the loading of the number P into said down-counter after a bit by bit loading of L bits of the identification code after the N read pulses.

13. An integrated circuit according to claim 12 wherein said data delivery circuit comprises a counter for counting the L bits in one bit loading cycles; and wherein said first logic circuit inhibits loading of said down-counter when the number L is reached.

14. An integrated circuit according to claim 1, wherein said shift register includes a parallel input for receiving the selection code from said controller.

15. An integrated circuit according to claim 1, wherein said shift register comprises:
    a demultiplexer circuit;
    a plurality of sub-registers connected in parallel, each sub-register having a serial input connected to said demultiplexer circuit, and a serial output; and
    a multiplexer circuit connected to a serial output of each sub-register.

16. An integrated circuit according to claim 1, wherein said communication interface circuit comprises a contactless communication interface operating via inductive coupling.

17. An integrated circuit according to claim 1, wherein the selective identification request is in accordance with an ISO/IEC/FCD 15693-3 standard.

18. A contactless chip card comprising:
- a contactless communication interface circuit operating via inductive coupling for receiving a selective identification request and a selection code;
- a logic comparator having a first input for receiving the selection code and a second input for receiving an identification code having N bits assigned to the contactless chipcard, and an output for delivering an equal signal if the selection and identification codes are equal;
- a shift register having a serial output coupled to the first input of said logic comparator for providing the selection code thereto;
- a serial memory for storing the identification code and having a serial output coupled to the second input of said logic comparator and to a serial input of said shift register;
- a controller connected to said contactless communication interface circuit, to said shift register and to said serial memory for loading the selection code into said shift register, and for applying M shift pulses to said shift register and N read pulses to said serial memory; and
- an inhibiting circuit connected to said shift register, to said controller and to said logic comparator for inhibiting said logic comparator when N shift and read pulses have been applied to said shift register and to said serial memory.

19. A contactless chip card according to claim 18, further comprising a data delivery circuit for delivering to said contactless communication interface circuit data in said shift register when said logic comparator delivers the equal signal.

20. A contactless chip card according to claim 18, wherein said inhibiting circuit comprises a first counting circuit for counting the N shift and read pulses in synchronization with one another, and for delivering an inhibit signal to said logic comparator when the N shift and read pulses have been counted.

21. A contactless chip card according to claim 20, wherein said first counting circuit comprises:
- a down-counter for receiving a signal from said controller corresponding to the number N; and
- a logic circuit connected to said down-counter for delivering the inhibit signal when said down-counter reaches zero.

22. A contactless chip card according to claim 18, wherein said inhibiting circuit inhibits said logic comparator when said logic comparator delivers an unequal signal if the selection and identification codes are not equal.

23. A contactless chip card according to claim 18, wherein said data delivery circuit delivers an authorization signal to said controller when said logic comparator delivers the equal signal, and comprises a logic circuit for preventing the delivery of the authorization signal when said logic comparator delivers an unequal signal if the selection and identification codes are not equal; and wherein said controller couples the serial output of said shift register to said communication interface circuit when the authorization signal is delivered.

24. A contactless chip card according to claim 18, wherein said shift register comprises:
- a demultiplexer circuit;
- a plurality of sub-registers connected in parallel, each sub-register having a serial input connected to said demultiplexer circuit, and a serial output; and
- a multiplexer circuit connected to a serial output of each sub-register.

25. A method for processing a selective identification request and a selection code in an integrated circuit having an identification code of M bits, the integrated circuit comprising a communication interface circuit for receiving the selective identification request and the selection code, a logic comparator having a first input for receiving the selection code and a second input for receiving the identification code, a shift register having a serial output coupled to the first input of the logic comparator, and a serial memory having a serial output coupled to the second input of the logic comparator and to a serial input of the shift register, the method comprising:
- storing the identification code in the serial memory;
- loading the selection code into the shift register;
- applying M shift pulses to the shift register and M read pulses to the serial memory;
- inhibiting the logic comparator when N shift and read pulses have been applied to the shift register and to the serial memory;
- delivering an equal signal from an output of the logic comparator if the selection and identification codes are equal; and
- delivering to the communication interface circuit data in the shift register when the logic comparator delivers the equal signal.

26. A method according to claim 25, wherein inhibiting the logic circuit is performed using an inhibiting circuit connected to the shift register and to the logic comparator; and further comprising:
- counting the N shift and read pulses in synchronization with one another; and
- delivering an inhibit signal to the logic comparator when the N shift and read pulses have been counted.

27. A method according to claim 25, further comprising inhibiting the logic comparator when the logic comparator delivers an unequal signal if the selection and identification codes are not equal.

28. A method according to claim 25, further comprising delivering an authorization signal to a controller when the logic comparator delivers the equal signal; wherein the controller is connected to the shift register, the serial memory and to the communication interface circuit; and further comprising:
- using the controller for preventing the delivery of the authorization signal when the logic comparator delivers an unequal signal if the selection and identification codes are not equal; and
- using the controller for coupling the serial output of the shift register to the communication interface circuit when the authorization signal is delivered.

29. A method according to claim 28, wherein delivering to the communication interface circuit data in the shift register is performed using a data delivery circuit that counts a number P and delivers the authorization signal when the number P is counted; and wherein the controller applies a counting signal to the data delivery circuit at each reception by the communication interface circuit of a response request to the selective identification request.

30. A method according to claim 29, wherein the data delivery circuit comprises:
- a down-counter;
- a first logic circuit for loading the number P into the down-counter; and
- a second logic circuit for delivering the authorization signal when said down-counter reaches zero.

31. A method according to claim 30, wherein the first logic circuit starts the loading of the number P after application of the N shift pulses to the shift register and the N read pulses to the serial memory if the logic comparator does not deliver the unequal signal.

32. A method according to claim 31, wherein the first logic circuit starts the loading of the number P into the down-counter after a bit by bit loading of L bits of the identification code after the N read pulses.

33. A method according to claim 25, wherein the shift register comprises:

a demultiplexer circuit;

a plurality of sub-registers connected in parallel, each sub-register having a serial input connected to the demultiplexer circuit, and a serial output; and a multiplexer circuit connected to a serial output of each sub-register.

34. A method according to claim 25, wherein the selective identification request is in accordance with an ISO/IEC/FCD 15693-3 standard.

* * * * *

UNITED STATES PATENT AND TRADEMARK OFFICE
CERTIFICATE OF CORRECTION

PATENT NO.    : 6,779,091 B2
DATED         : August 17, 2004
INVENTOR(S)   : Ahmed Kari and Chirstophe Moreaux It is certified that error appears in the above-identified patent and that said Letters Patent is hereby corrected as shown below:

Column 13,
Lines 7 and 22, delete "N" insert -- M --

Signed and Sealed this

Twenty-second Day of March, 2005

JON W. DUDAS
*Director of the United States Patent and Trademark Office*